United States Patent [19]

Rudzyanskas et al.

[11] Patent Number: 4,909,682
[45] Date of Patent: Mar. 20, 1990

[54] TABLE POSITIONING DEVICE FOR METAL-CUTTING MACHINE TOOLS

[76] Inventors: Juozas P. Rudzyanskas, prospekt Taikos, 40, kv. 22; Alexei A. Shkolyarenko-Milukas, ulitsa Gvardechju, 89, kv. 42; Galina J. Rudzyanskaite, prospekt Taikos, 40, kv. 22, all of Kaunas, U.S.S.R.

[21] Appl. No.: 220,613

[22] Filed: Jul. 18, 1988

[51] Int. Cl.[4] ............................................. B23Q 1/14
[52] U.S. Cl. ...................................... 409/145; 74/25; 409/219
[58] Field of Search ............... 409/145, 147, 219, 224, 409/235, 241, 220; 74/25–27; 108/140

[56] References Cited

U.S. PATENT DOCUMENTS 2,859,667  11/1958  Teubner .......................... 409/219 X
4,198,183   4/1980  Kummer et al. ............... 409/145 X

OTHER PUBLICATIONS

Textbook "Jig-Boring Machine 2431", Service Manual, Part 1, V/O Stankoimport, Moscow, C.6, Fig. 4, pp. 11, 13, 14, Fig. 9, In Russian-no translation.

*Primary Examiner*—Steven C. Bishop
*Attorney, Agent, or Firm*—Lilling & Greenspan

[57] ABSTRACT

The herein proposed invention relates to mechanical engineering. The essence of the invention resides in the fact that a contrivance for setting the table position includes two disks provided with drives for moving the table in a horizontal plane and disposed eccentrically one above the other as to be free to rotate about their pivot pins, the upper disk being rotatably mounted with respect to the pivot pin of the lower disk. The pivot pin of the lower disk mounts one device for reading the length of table movement in a horizontal plane along one of the coordinate axes, and a pin is fixed in position on the upper disk a distance from its axis equal to the amount of eccentricity between the pivot pins, the pin being movably associated with the table so as to carry another device for reading the length of table movement in a horizontal plane along the other of the coordinate axes. Additionally, the contrivance for setting the table position includes elements movably associated with each other, one extreme element of these being a driving member attached to the base, while the other extreme element is a driven member attached to the table, the gearing ratio between the driving element and the driven element being equal to 1.

9 Claims, 7 Drawing Sheets

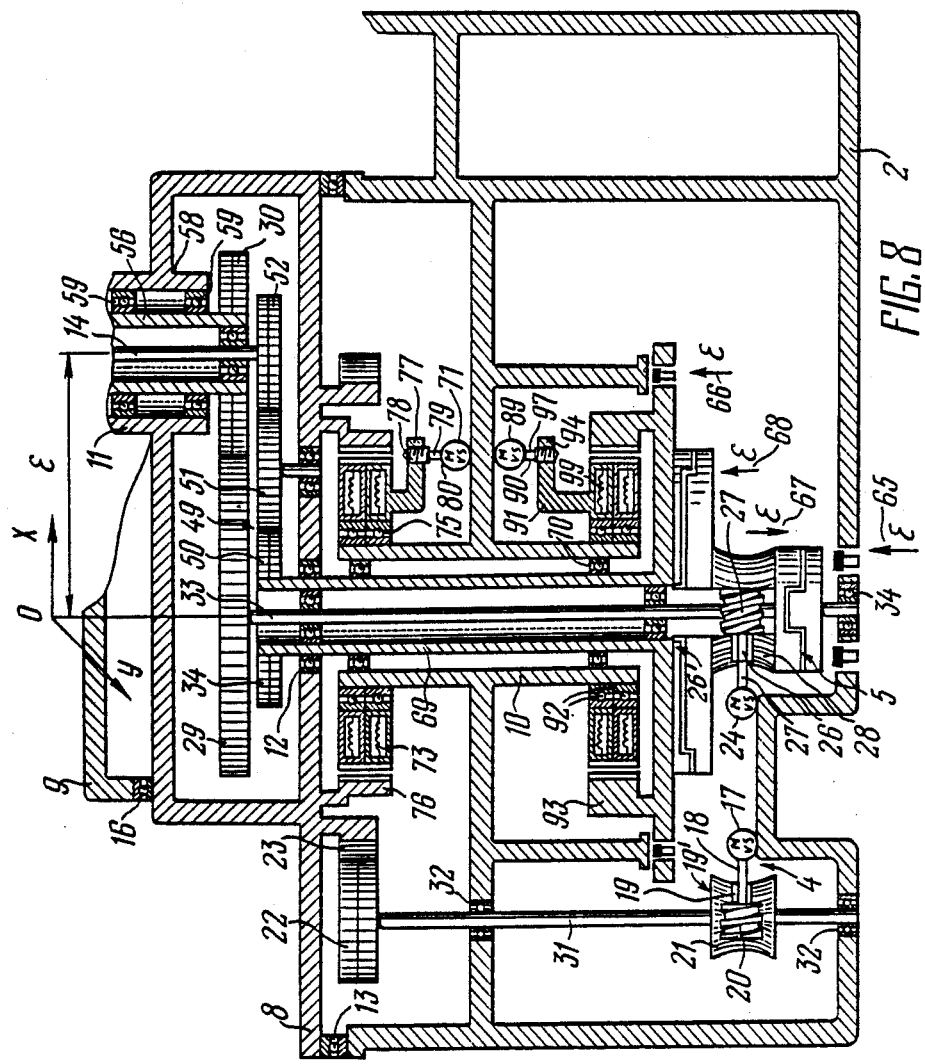

TABLE POSITIONING DEVICE FOR METAL-CUTTING MACHINE TOOLS

BACKGROUND OF THE INVENTION

1. Field of the Invention

The present invention relates generally to mechanical engineering and more specifically, to a device for positioning the table in metal-cutting machine tools in a horizontal plane along two coordinate axes.

The invention may be used to best advantage for machining holes or curvilinear surfaces in workpieces using numerically controlled machine tools, such as, for example, jig-boring, jig-grinding or milling machines.

2. Description of the Prior Art

Known in the art is a device for positioning the table of a metal-cutting machine tool in the XOY horizontal plane, along two coordinate axes X and Y, which is incorporated in a numerically controlled jig-boring machine (cf., a textbook "Jig-Boring Machine 2431", Service Manual, Part 1, V/O "Stankoimport", Moscow, c.6, FIG. 4, pages 11, 13, 14, FIG. 9, in Russian). The prior art device comprises a table mounted on the machine base and a contrivance for setting the position of the table in the XOY horizontal plane, as the table is moved. When the table is moved, its adjacent sides are in parallel alignment with the X and Y coordinate axes in the horizontal plane. Additionally, the device includes two drives adapted to move the table along either of the coordinate axes in the horizontal plane, the drives being mechanically interlinked with the said contrivance, and two means for reading the length of table travel along each of the coordinate axes disposed in the same plane which are also mounted on the machine base.

In the aforementioned known device the contrivance for setting the position of the table during its traverse comprises V-ways mounted on the base, and a slide which is provided with lower and upper V-ways disposed at right angles to each other (in a crosswise manner). The slide is placed with its lower ways onto the base ways, whereas its upper ways support the table provided with ways mating with the upper V-ways of the slide. Both drives imparting movement to the table are accommodated in the slide.

The drive to impart table movements along one of the coordinate axes comprises an electric motor provided with a reducer, and a gear which is mounted on the output shaft of the reducer and engages with a toothed rack rigidly secured to the table. This drive actuates table rectilinear movements along the slide.

The embodiment of the drive imparting table movements along the other of the coordinate axes is similar to that described above, except for the toothed rack, which, in this case, is rigidly secured to the machine base. This drive actuates rectilinear movements of the slide with the table in a direction perpendicular to that of table movement over the slide. Thus, the table is movable in the horizontal plane along two coordinate axes.

Constructionally, the embodiment of the contrivance for setting the position of the table as the slide having V-ways, fails to provide error-free positioning of the table since neither the slide proper nor its V-ways offer sufficient rigidity and manufacturing accuracy.

Attempts to improve the slide rigidity by increasing its height increase the positioning error still further. Besides, the table movement drives are mounted on the slide, which generates a need for long, non-rigid kinematic trains to impart motion from the electric motors to the final members of the train, i.e., the table and the slide, whereby the dynamic characteristics of the table positioning contrivance are impaired.

The kinematic trains of the table and slide actuation drives can be reduced in length by the employment of high-torque d.c. electric motors whose rotational speed can be varied within a wide range, and recirculating ball screw drives. In this case, the kinematic train will only comprise a single gear drive required for increasing the torque imparted by the electric motor, and a preloaded ball screw drive. However, recirculating ball screw drives are too sophisticated to manufacture, which makes drives of this type rather expensive. Moreover, these drives fail to provide stable dependability in operation since they are highly sensitive to overloads as well as to pollution of oil by dust even in small amounts, and, what is more, the kinematic motion transfer train still remains too long.

The table and slide mount one means for reading the length of table movement in a single plane along one of the coordinate axes, whereas the slide and base support another means for reading the length of table movement in the same plane along another of the coordinate axes.

In the aforementioned prior-art device, either of the means for reading the length of table movement comprises a measuring scale and a photoelectric microscope whereby optical readings are converted into electric pulses which are fed to the machine numerical control unit.

It is evident from the foregoing explanations that a construction where V-ways are arranged cross-wise at right angles to each other, in combination with the means for reading the length of table movement, will inevitably cause a substantial increase in the overall dimensions of the device and present problems during its installation. Rectilinear movements of the table and slide are obtained from the electric motors whose rotary motion is converted into translational motion via rather long drive chains. Besides, in a number of cases two- or three-speed drives may be required for more accurate positioning of the final member, i.e., the table. To complicate matters, the separate drives must be arranged so as to be mounted on the slide, which increases the overall dimensions of the device still further. The automation of table positioning through the employment of a numerical control system also poses a severe problem because the means of conveyance (ball screw drives) of the drives fail to provide the necessary feedback. If a numerical control system is to be used, the device must be supplemented with two readout systems providing the necessary feedback, which is unfeasible without increasing the overall dimensions of the device. This offers the only satisfactory explanation of the current situation when most of numerically controlled machine tools suffer from being too bulky whereas numerically controlled machines of compact design are practically not available.

SUMMARY OF THE INVENTION

It is therefore a primary object of the present invention to provide a device for positioning the table of a metal-cutting machine tool in a horizonal plane along two coordinate axes, which would be made in such a way as to offer extended processing capacities.

It is also an object of this invention to provide a device for positioning the table of a metal-cutting machine tool in a horizontal plane along two coordinate axes, which would be made in such a way as to secure a high speed of table positioning.

It is another object of this invention to provide a device for positioning the table of a metal-cutting machine tool in a horizontal plane along two coordinate axes, which would be made in such a way as to secure a high accuracy of table positioning.

It is an additional object of this invention to provide a device for positioning the table of a metal-cutting machine tool in a horizontal plane along two coordinate axes, which would be made in such a way as to increase the number of degrees of freedom of the table.

It is still another object of this invention to provide a device for positioning the table of a metal-cutting machine tool in a horizontal plane along two coordinate axes, which would be made in such a way as to reduce the overall dimensions of the machine tool.

With the foregoing and other objects in view the present invention thus resides in a device for positioning the table of a metal-cutting machine tool in a horizontal plane along two coordinate axes, comprising a contrivance which is mounted on the machine base and adapted to set the position of the table during its movement at which the adjacent sides of the table are in parallel alignment with the coordinate axes in the horizontal plane, two drives adapted to move the table in the horizontal plane, each of said drives being kinematically associated with the contrivance for setting the position of the table, and two means for reading the length of table movements in the horizontal plane, each of said means being adapted to read the length of table movement along its own coordinate axis. According to the invention, the contrivance for setting the position of the table comprises two disks, each of said disks being kinematically associated with its own drive to impart movement to the table in the horizontal plane and disposed one above the other as to be free to rotate about their pivot pins which are eccentrically arranged with respect to each other, the upper disk being rotatably mounted with respect to the pivot pin of the lower disk, which pivot pin carries a means for reading the length of table movement in said plane along one of the coordinate axes, and a pin fixed in position on the upper disk a distance from the axis thereof equal to the amount of eccentricity of the axis of the respective disk, said pin being movably associated with the table so as to carry a means for reading the length of table movement in said plane along the other of the coordinate axes. Additionally, said contrivance comprises elements movably associated with each other, one extreme element of said elements being a driving member attached to the base, while the other extreme element is a driven member attached to the table, the gearing ratio between the driving element and the driven element being equal to 1.

The constructional arrangement of the contrivance for setting the position of the table during its movement includes disks, a pin, a bearing table, and elements movably associated with each other, which enables the table to be moved along a desired pathway and eliminates the need for the rotary motion to be converted into translational motion. Consequently, the device gains additional degrees of freedom of table movement along any directions in the horizontal plane, which, in turn, extend the technological capabilities of the device. Furthermore, shorter kinematic trains improve the dynamic characteristics of the device and allow the overall dimensions of the machine tool to be reduced. Besides, disks are simpler and less expensive to manufacture and install than compound V-ways.

It is technologically expedient that each of the drives for moving the table in the horizontal plane should comprise an electric motor having a shaft thereof rigidly locked-in with the input shaft of a worm gear reducer whose worm engages with a worm wheel mounted on the reducer output shaft which carries a gear meshing with another gear fixedly secured on the respective disk.

Such a constructional arrangement of the drives for moving the table in the horizontal plane enables the table to be positioned to preset coordinates through shortest possible pathways along different directions as desired, and it provides for various table movement pathways given by mathematical equations, to be obtained.

It is expedient that the elements movably associated with each other and incorporated in the contrivance for setting the table position, be arranged so as to form a double four-link mechanism having a driving link thereof articulately joined to the base, and a driven link thereof articulately joined to the table.

The double four-link mechanism allows one to move the table in the horizontal plane along different directions while at the same time holding it against rotation about a vertical axis, when employed in high-precision machine tools.

It is also technologically practicable that the contrivance for setting the table position be provided with a drive adapted to turn the table about a vertical axis through a preset angle and to hold it therein, said drive being comprised of a segment having a shaft thereof articulately joined to the driving link of the double four-link mechanism, an electric motor, and two electromagnetic clutches of which one clutch is used to join the electric motor shaft to the segment shaft, whereas the other clutch joins the segment shaft to the base.

Provision of the above-described drive adapted to turn the table through a preset angle and hold it therein, when employed in combination with the double four-link mechanism, makes it possible to obtain an additional degree of freedom for movement of the table carrying a workpiece to be machined, i.e., not only the workpiece can be moved with respect to coordinate axes in the course of machining but also it can be rotated about its axis. This eliminates the need for detachable rotary tables.

It is constructionally reasonable that the elements movably associated with each other and incorporated in the contrivance for setting the table position be arranged so as to form a gear transmission comprising a driving gear and an even number of driven gears, said driving gear being fixedly secured to the table.

The gear transmission enables the motion train to be preloaded due to employment of spring-loaded double gears whereby the table is prevented from being turned about its vertical axis as it is moved along different pathways in the same plane, which allows the overall dimensions of the device to be reduced as compared with the construction using a double four-link mechanism.

It is desirable that the elements movably associated with each other and incorporated in the contrivance for setting the table position be fashioned substantially as a chain transmission wherein a driving sprocket is locked in position with the base, while the last driven sprocket of the chain transmission is fixedly secured to the table.

The chain transmission makes possible elimination of backlash by tensioning the chain proper, which in turn simplifies the construction and reduces the cost of manufacture of tables for machine tools of standard and high accuracies.

It is technologically reasonable that the contrivance for setting the table position be provided with a drive adapted to turn the table about a vertical axis through a preset angle and to hold it therein, said drive being comprised of two braking electromagnetic clutches, one of which is used to join the base to the output shaft of the worm gear reducer of the upper disk drive and the other one is used to join the base to the driving gear of the gear transmission or to the driving sprocket of the chain transmission, and of two engagement electromagnetic clutches, one of which joins the worm wheel of the worm gear reducer of the upper disk drive to the output shaft of said reducer while the other one is used to join the worm wheel of the worm gear reducer of the upper disk drive to the driving gear of the gear transmission or to the driving sprocket of the chain transmission.

The aforementioned drive, when employed in combination both with the gear transmission and with the chain transmission, allows the table drive units of the machine tool to be considerably simplified and makes it possible to increase the number of degrees of freedom for the table during its movement, i.e., the table, when being moved with respect to the coordinate axes, can be turned about its vertical axis through any angle, including angles as great as 360°.

It is most expedient from a constructional point of view that each of the means for reading the length of table movement should comprise a stepped electric motor and a circular electroinductive transducer. It is also reasonable that the circular electroinductive transducer of one of the means should comprise a stator and arm locked-in with each other and mounted on the pivot pin of the lower disk, an armature fixedly secured to the lower disk proper, and a ball screw drive having a nut thereof fixedly secured to the arm and a screw thereof attached to the base, whereas the circular electroinductive transducer of the other means should comprise a stator and arm locked-in with each other and mounted on the pin, an armature fixedly secured on the upper disk, and a ball screw drive having a nut thereof fixedly secured to the arm and a screw thereof attached to the table, said screw in each of the ball screw drives being kinematically associated with the shaft of its own stepped motor which is electrically associated with the stator of its own circular electroinductive transducer via a pulse setter.

Such a constructional arrangement of the measuring means provides for direct measurement of the movements of the operative members, i.e., the rotation of the disks, measurement results being obtained and displayed by direct electric indication in a form convenient for the control system, which minimizes the total readout error. Besides, such interlinking between the disks of the device and the measuring transducers obviates the error due to radial runout of the disks. Furthermore, from a technological point of view, electroinductive transducers are simpler and less expensive to manufacture than optical or photoelectric measuring means.

BRIEF DESCRIPTION OF THE DRAWINGS

In what follows the present invention will now be disclosed in a detailed description of an illustrative embodiment thereof with reference to the accompanying drawings, wherein:

FIG. 8 is a diagrammatic longitudinal sectional view of a table rotary drive for the contrivance for setting the table position made substantially as a chain transmission, according to the invention.

DESCRIPTION OF THE PREFERRED EMBODIMENTS

Figure 1:
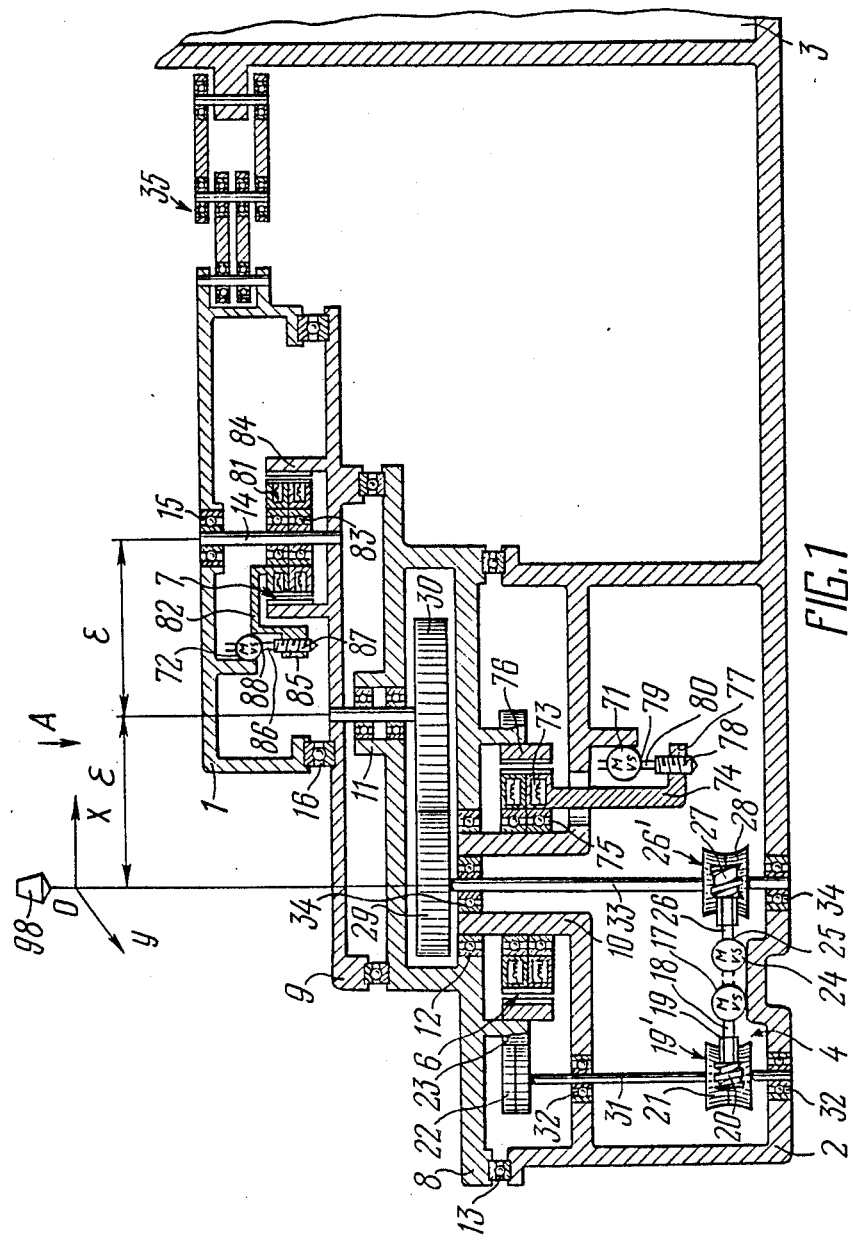
FIG. 1 is a diagrammatic longitudinal sectional view of a table positioning device wherein a contrivance for setting the table position is made substantially as a double four-link mechanism, according to the invention.
Figure 2:
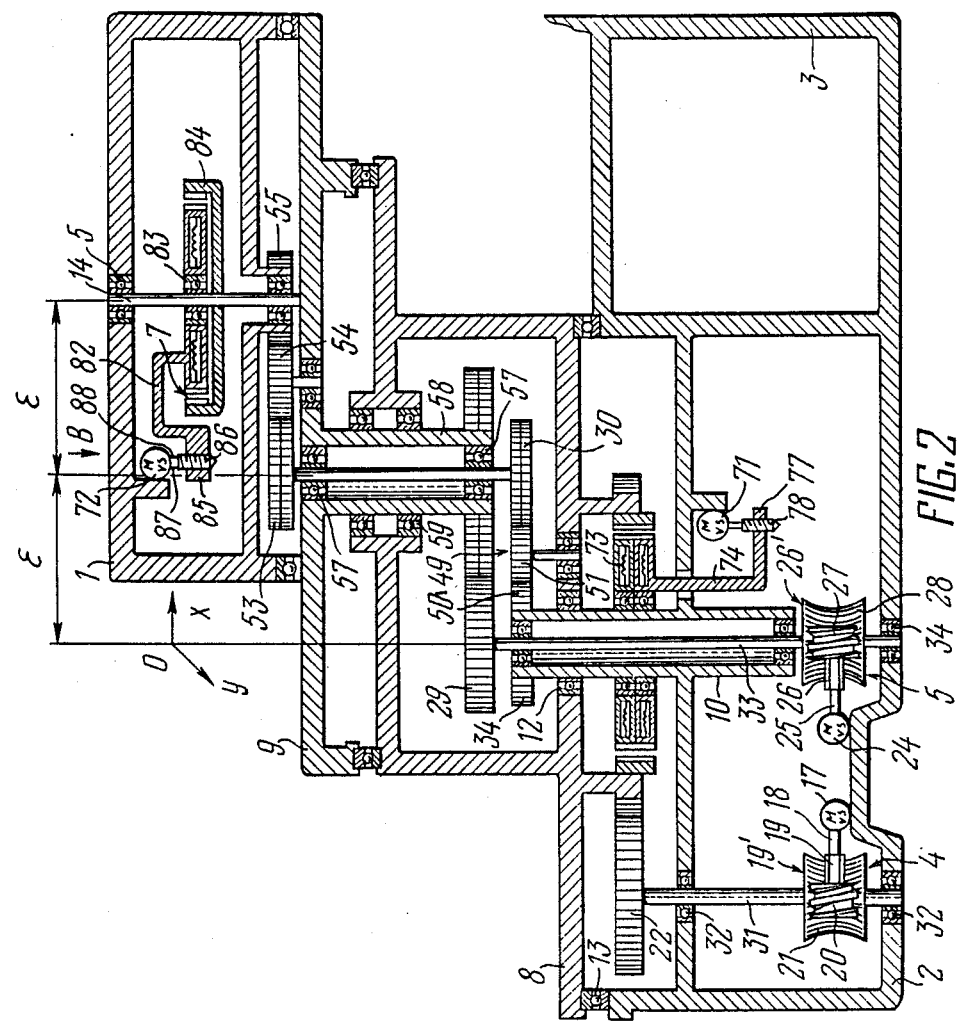
FIG. 2 is a diagrammatic longitudinal sectional view of a table positioning device wherein a contrivance for setting the table position is made substantially as a gear transmission, according to the invention.
Figure 3:
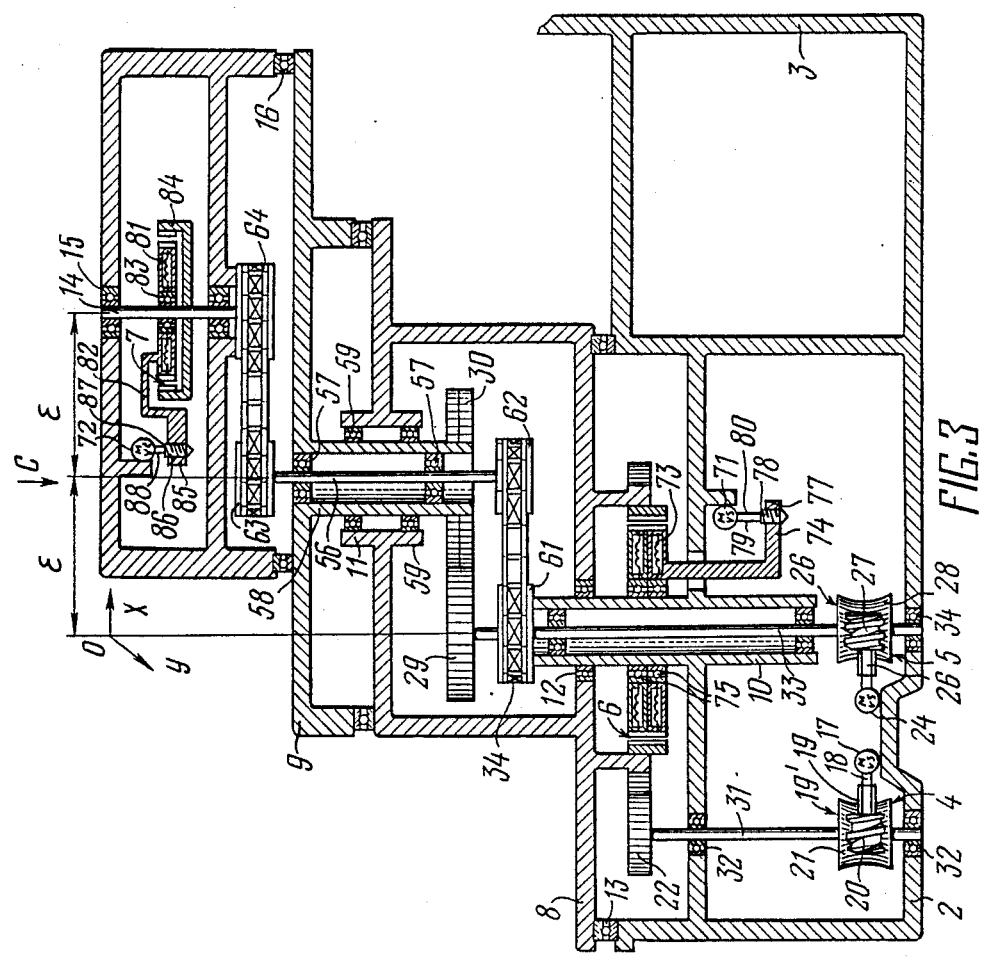
FIG. 3 is a diagrammatic longitudinal sectional view of a table positioning device wherein a contrivance for setting the table position is made substantially as a chain transmission, according to the invention.

The herein proposed device for positioning a table 1 of a metal-cutting machine tool in a horizontal plane XOY along two coordinate axes X and Y, is illustrated in FIGS. 1,2,3.

An embodiment of the present invention is considered hereinbelow in conjunction with a numerically controlled jig-boring machine 2, wherein a device according to the invention is incorporated.

In accordance with the herein disclosed device, a base 3 of the above-described machine tool 2 mounts a contrivance for setting the table position during its movement, in the course of which the adjacent sides of the table 1 are in parallel alignment with coordinate axes X and Y in a horizontal plane XOY, two drives 4 and 5 adapted to move the table in the horizontal plane XOY, each of these drives being kinematically associated with the contrivance for setting the table position, and two means 6 and 7 adapted to read the length of table movement in the horizontal plane XOY, each of these means being adapted to read the length of table movement along one of the coordinate axes X or Y in the plane XOY, that is the means 6 is for coordinate axis X, and the means 7 is for coordinate axis Y.

According to the invention, the contrivance for setting the table position comprises two disks 8 and 9, each of said disks being kinematically associated with its own drive 4 or 5 and disposed one above the other. Hereinafter the disk 8 will be referred to as the lower disk, while the disk 9, as the upper disk. The disk 8 and the disk 9 are mounted as to be free to rotate about their pivot pins 10 and 11, respectively, which are eccentrically arranged with respect to each other, the amount of eccentricity being $\epsilon$.

The lower disk 8 is rotatably supported in a radial bearing 12 and a thrust bearing 13 secured in the base 2. The pivot pin 10 of the lower disk 8 carries the means 6 for reading the length of table movement in the plane XOY along the coordinate axis X. A pin 14 is fixed in a position on the upper portion of the upper disk 9 a distance from the pivot pin 11 thereof equal to the amount of eccentricity $\epsilon$ of the pivot pins 10 and 11 of the disk 8 and the disk 9 with respect to each other, said pin 14 being associated with the table 1 through the agency of a rolling-contact radial bearing 15 and a thrust bearing 16. The pin 14 of the upper disk 9 mounts the means 7 for reading the length of table movement along the coordinate axis Y in the plane XOY.

Additionally, the contrivance for setting the table position comprises elements movably associated with each other, one extreme element of said elements being a driving member attached to the base while the other extreme element is a driven member attached to the table 1.

The gearing ratio between the driving element and the driven element is equal to 1.

The drive 4 adapted to move the table along the coordinate axis X in the plane XOY, comprises a drive to impart rotary motion to the lower disk 8 which incorporates an electric motor 17 having a shaft 18 thereof rigidly locked-in with an input shaft 19 of a worm gear reducer 19' whose worm 20 engages with a worm wheel 21 imparting motion to a gear 22 meshing with another gear 23 fixedly secured on the lower disk 8.

The drive 5 adapted to move the table along the coordinate axis Y in the plane XOY, comprises a drive to impart rotary motion to the upper disk 9 which incorporates an electric motor 24 having a shaft 25 thereof rigidly locked-in with an input shaft 26 of a worm gear reducer 26' whose worm 27 engages with a worm wheel 28 imparting motion to a gear 29 meshing with another gear 30 fixedly secured on the upper disk 9.

The worm wheel 21 is mechanically linked to the gear 22 through the agency of an output shaft 31 of the worm gear reducer 19' supported in rolling-contact radial bearings 32, whereas the worm wheel 28 is mechanically linked to the gear 29 through the agency of an output shaft 33 of the worm gear reducer 26' supported in rolling-contact radial bearings 34.

Figure 4:
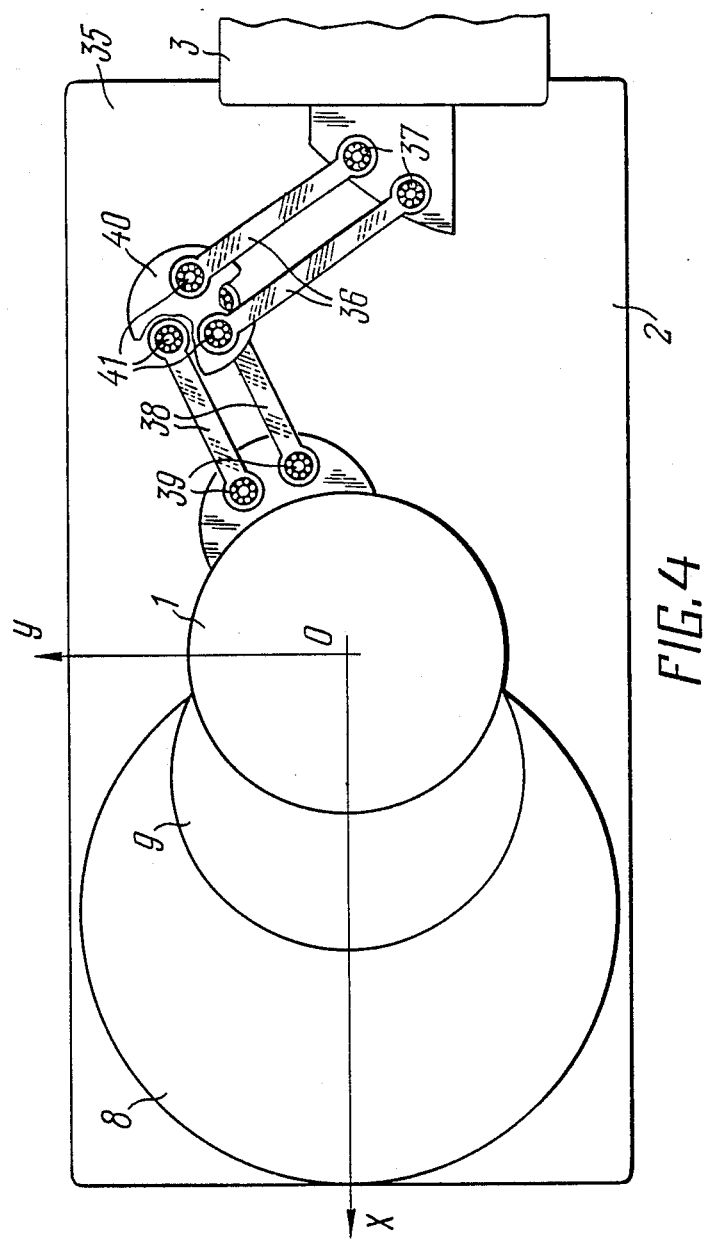
FIG. 4 is a view of a double four-link mechanism, as seen facing an arrow A in FIG. 1.

FIG. 4 illustrates an embodiment of a construction of a contrivance for setting the table position wherein the elements movably associated with each other are arranged so as to form a double four-link mechanism 35 having a driving link 36 thereof joined to the base 2 by hinges 37, and a driven link 38 thereof joined to the table 1 by hinges 39.

The four-link mechanism 35 has a common link 40 thereof which is connected to the driving link 36 and the driven link 38 by hinges 41.

Figure 5:
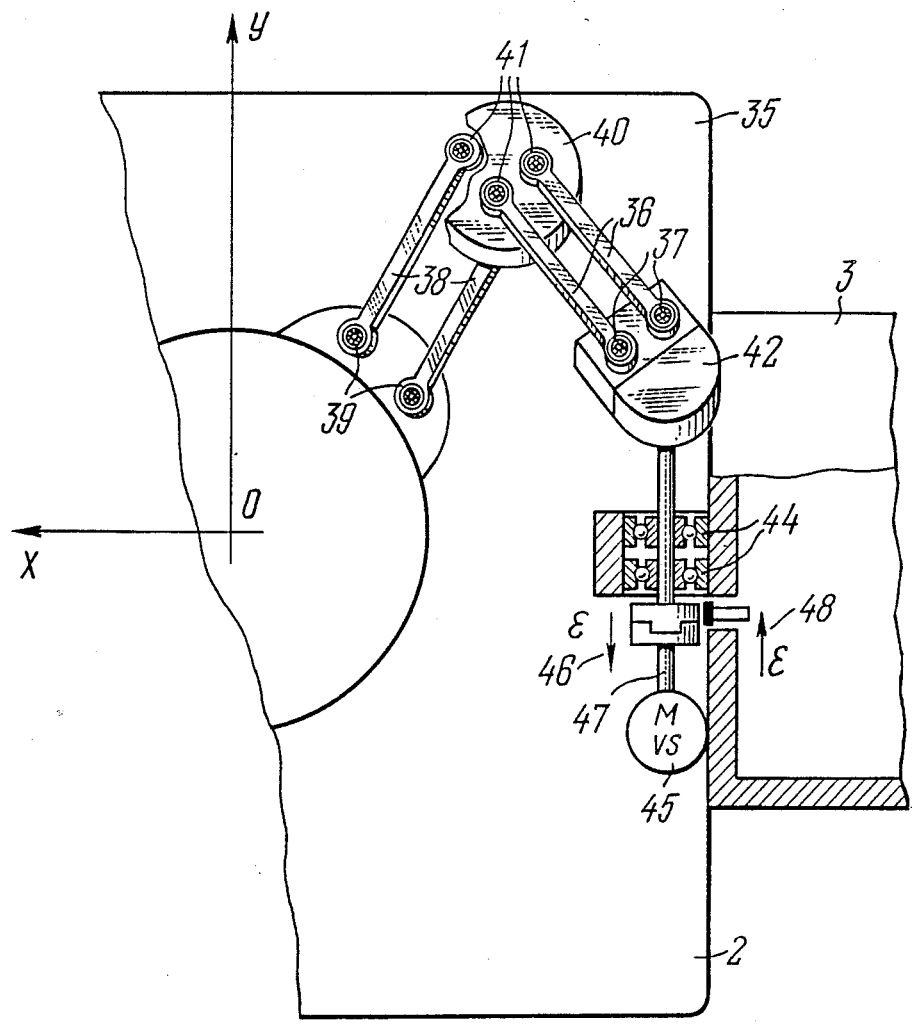
FIG. 5 is a diagrammatic plan view of a table rotary drive for the contrivance for setting the table position made substantially as a double four-link mechanism, according to the invention.

FIG. 5 shows a drive adapted to turn the table about a vertical axis through a preset angle and to hold it therein, as employed in the double four-link mechanism 35.

This drive is comprised of a segment 42 provided with a shaft 43 mounted on the base 2 by means of bearings 44. Hinges 37 of the driving link 36 of the four-link mechanism 35 are held stationary to the segment 42.

Besides, the drive also incorporates an electric motor 45, an engagement electromagnetic clutch 46 used to connect a shaft 47 of the electric motor 45 to the shaft 43 of the segment 42, and a braking electromagnetic clutch 48 which is used to lock the shaft 43 of the segment 42 in position with the base 2.

Figure 6:
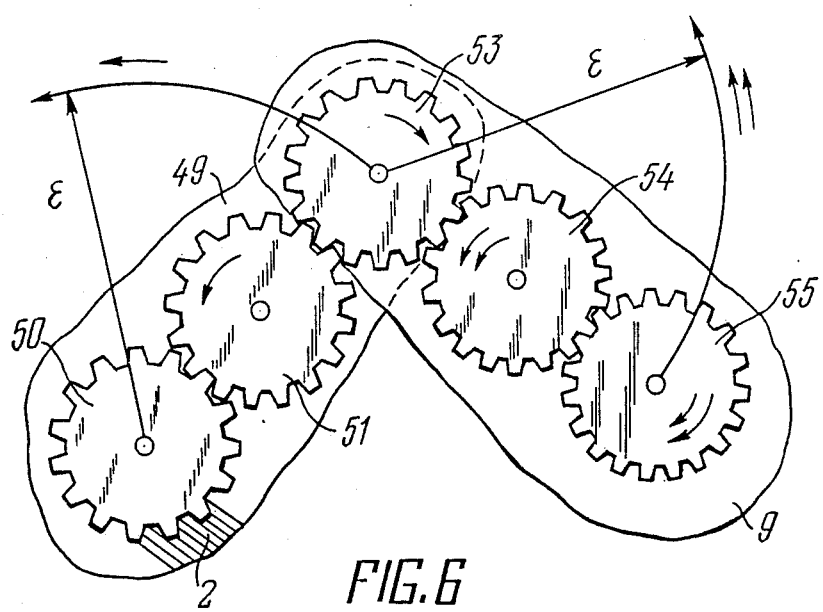
FIG. 6 is a view of a gear transmission, as seen facing an arrow B in FIG. 2.

FIG. 6 represents an alternative embodiment of a contrivance for setting the table position wherein the elements movably associated with each other are arranged so as to form a gear transmission 49 which comprises a driving gear 50 and an even number of driven gears 51,52 (FIG. 2), 53 (FIG. 6), 54 and 55. The driving gear 50 is fixedly secured to the base 2, while the gear transmission 49 has the last driven gear 55 thereof fixedly secured to the table 1.

Inasmuch as the gearing ratio between the driving element, i.e., the driving gear 50, and the last driven element, i.e., the driven gear 55, is equal to 1, the driven gears 52 and 53 locked-in with a shaft 56 at the extensions thereof, can be regarded as a single gear included in the gear transmission 49.

In its turn, the shaft 56 is rigidly locked-in with the upper disk 9 by means of rolling-contact bearings 57 and a sleeve 58 which is supported by the pivot pin 11 and mounted on the lower disk 8 in rolling-contact bearings 59.

Figure 7:
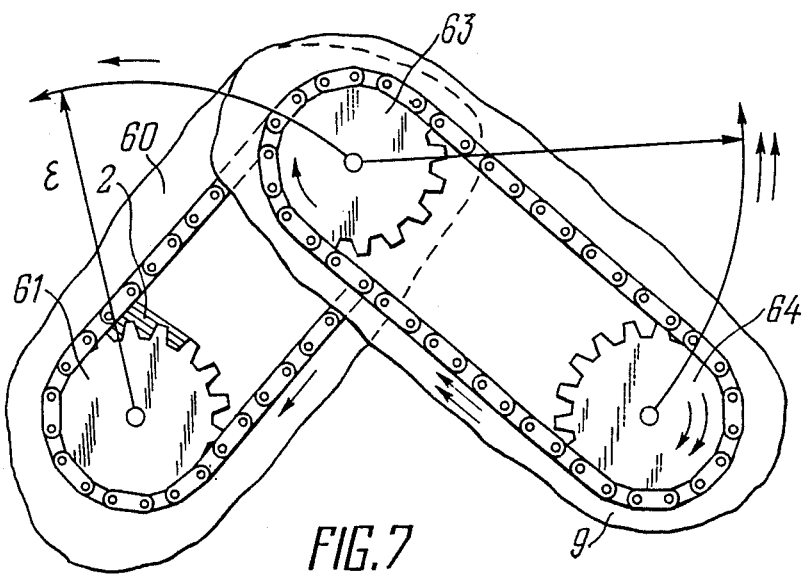
FIG. 7 is a view of a chain transmission, as seen facing an arrow C in FIG. 3.

FIG. 7 displays another embodiment of a contrivance for setting the table position wherein the elements movably associated with each other are arranged so as to form a chain transmission 60 comprising a driving sprocket 61 locked in position with the base 2, and driven sprockets 62 (FIG. 3), 63 (FIG. 7), 64. The last driven sprocket 64 of the chain transmission is fixedly attached to the table 1.

The driven sprockets 62 and 63, alike the driven gears 52 and 53, are locked-in with the shaft 56 at the extensions thereof.

FIG. 8 illustrates an embodiment of a table positioning device provided with a drive adapted to turn the table about a vertical axis through a preset angle and to hold it therein. This drive is used in combination with the contrivances for setting the table position fashioned substantially as the gear transmission 49 and the chain transmission 60.

The drive comprises two braking electromagnetic clutches 65 and 66 and two engagement electromagnetic clutches 67 and 68. The braking clutch 65 is used to connect the base 2 to the output shaft 33 of the worm gear reducer 26' incorporated in the drive imparting rotation to the upper disk 9, while the braking electromagnetic clutch 66 is used to connect the base 2 to the driving gear 50 of the gear transmission 49 or to the driving sprocket 61 of the chain transmission 60. Said driving gear 50 or the driving sprocket 61 are locked in position on a shaft 69 supported by means of bearings 70 in the base 2.

The engagement clutch 67 connects the worm wheel 28 of the drive imparting rotation to the upper disk 9 to the output shaft 33 of the worm gear reducer 26' incorporated in the drive imparting rotation to the upper disk 9. The engagement clutch 68 connects the worm wheel 28 to the driving gear 50 of the gear transmission 49 or to the driving sprocket 61 of the chain transmission 60.

Each of the means 6 and 7 for reading the length of table movement comprises a stepped electric motor denoted 71 (FIGS. 1,2,3 and 8) and 72, respectively, and a circular electroinductive transducer. The circular electroinductive transducer incorporated in the means 6 comprises a stator 73 and an arm 74 locked-in with each other and mounted in bearings 75 on the pivot pin 10 of the lower disk 8, an armature 76 fixedly secured on the disk 8 proper, and a ball screw drive having a nut 77 thereof fixedly secured to the arm 74 and a screw 78 thereof attached to the base 2 and connected, through the agency of a clutch 79, to a shaft 80 of the stepped motor 71.

The circular electroinductive transducer incorporated in the means 7 comprises a stator 81 and an arm 82 locked-in with each other and mounted in bearings 83 on the pin 14, an armature 84 fixedly secured on the upper disk 9, and a ball screw drive having a nut 85 thereof fixedly secured to the arm 82 and a screw 86 thereof mounted on the table 1 and connected, through the agency of a clutch 87, to a shaft 88 of the stepped motor 72. Each of the stepped motors 71 and 72 is electrically associated with its own stator 73 and 81, respectively, through a pulse setter (not shown).

To determine the angle of turn of the driving gear 50, the device incorporates a stepped electric motor 89 and a circular electroinductive transducer comprising a stator 90 (FIG. 8) and an arm 91 locked-in with each other and mounted in bearings 92 on the pivot pin 10 of the lower disk 8, an armature 93 fixedly secured to the shaft 69, and a ball screw drive having a nut 94 thereof locked in position on the arm 91, and a screw 95 thereof mounted on the base 2 and connected, through the agency of a clutch 96, to a shaft 97 of the stepped motor 89.

The device for positioning the table in a metal-cutting machine tool in a horizontal plane along two coordinate axes, operates in the following manner.

The device is to be installed on the machine tool in such a way as to bring the geometric axis of rotation of the pivot pin 10 of the lower disk 8 in alignment with the geometric axis of a machine spindle 98. Then, by rotating the disks 8 and 9, any point of the working surface of the table 1, which is equal to the area of a circle with a radius of $2\epsilon$, can be set opposite the geometric axis of the machine spindle 98, in other words a workpiece mounted on the table 1 can be positioned to preset coordinates for machining. By adjusting the rate of rotation of the disks 8 and 9, one can obtain different pathways for the movement of the table 1, to suit the various shapes of the workpieces to be machined. This eliminates the need to locate the workpiece on the datum surface before it is held to the machine table 1, because machining, for example, contour milling, can be conducted along different directions from the datum surface of the workpiece. A datum surface on the table for holding the workpiece can be chosen arbitrarily, in any direction. This proves to be a very useful characteristic of the herein proposed device since in prior art machine tools the alignment of the workpiece datum surfaces with the direction of table movement is known to be a time-consuming and unavoidable operation.

When the electric motors 17 and 24 are started, rotary motion is transmitted as follows: from the electric motor 17, via shafts 18 and 19, the worm 20, the worm wheel 21, the shaft 31, the gear 22 and the gear 23, to the lower disk 8, and from the electric motor 24, via shafts 25 and 26, the worm 27, the worm wheel 28, the shaft 33, the gear 29 and the gear 30, to the upper disk 9. In consequence of this, disks 8 and 9 are turned through preset angles whereby the table 1 is moved to preset coordinates X and Y in the XOY horizontal plane.

The amount of turning and the rate of rotation of disks 8 and 9 are checked by the electroinductive transducers incorporated in means 6 and 7 for reading the length of table movement with respect to coordinate axes X and Y.

The transducer of the means 6 effects direct control over rotation of the disk 8, and the transducer of the means 7 gives an indication of the total amount of rotation of the disks 8 and 9. Thus, by turning disks 8 and 9 about their pivot pins 10 and 11, the pin 14, as well as the table 1, can be positioned to preset coordinates or be moved along a desired pathway. A preset direction of the table 1 during its movement is established and maintained by the contrivance for setting the table position.

To obtain a desired angle of rotation of the disk 8, the stepped motor 71 is started to turn the screw 78 and, by moving the nut 77, to actuate the arm 74.

The arm 74 turns the stator 73 to bring it to a preset position corresponding to the preset amount of the total angle of rotation of disks 8 and 9.

As the lower disk 8 and hence the armature 76, is rotated, data about the amount of the angle of rotation of the disk 8 is being fed to the machine control system, and as soon as the preset amount of angle of rotation is reached, a command is delivered for stopping the motor 17, whereby the rotation of the disk 8 is also stopped.

To obtain a desired total angle of rotation of disks 8 and 9, the stepped motor 72 is started to turn the screw 86 and, by moving the nut 85, to actuate the arm 82. The arm 82 turns the stator 81 to bring it to a preset position corresponding to the preset amount of the total angle of rotation of disks 8 and 9. As the upper disk 9 and hence the armature 84, is rotated, data about the amount of the total angle of rotation of disks 8 and 9 is being fed to the machine control system, and as soon as the preset amount of the total angle of rotation is reached, a command is delivered for stopping the motor 24, whereby the rotation of the disk 9 is also stopped.

In the case when a table positioning device comprises a contrivance for setting the table position fashioned as the double four-link mechanism 35, the links 36 and 38 of the mechanism 35 prevent the table 1 from being turned about its vertical axis, but do not preclude movement of the table in the XOY horizontal plane. The lower disk 8 and the upper disk 9 can be rotated either simultaneously or separately. Independent rotation of the disk 8 is possible even when the upper disk 9 is braked by the motor 24, since in this case the gear 30 will revolve around the gear 29.

To rotate the table 1 about its vertical axis, the motor 45 is started, the engagement clutch 46 is engaged, and the braking clutch 48 is disengaged. From the electric motor 45 rotation is imparted, via the shaft 47, the clutch 46 and the shaft 43, to the segment 42 which actuates links 36 and 38 of the double four-link mechanism 35 to turn the table 1 about its vertical axis through a preset angle. Once the table 1 has been turned, the braking clutch 48 is engaged whereby the table 1 is locked in position so attained.

In the case when a table positioning device comprises a contrivance for setting the table position fashioned as a gear transmission, the table 1 is held in a preset position and prevented from being turned about its vertical axis by gears 29,51,52,53,54 and 55.

Whenever a contrivance for setting the table position is fashioned as a chain transmission, the table 1 is held in a preset position and prevented from being turned about its vertical axis by sprockets 61,62,63 and 64.

To rotate the table 1 about its vertical axis, the engagement electromagnetic clutch 68 is engaged, the braking electromagnetic clutch 66 is disengaged and the electric motor 24 is started. From the electric motor 24 rotation is imparted, via the worm 27, the worm wheel 28, the shaft 69, the driving gear 50, and, further, through driven gears 51,52 and the shaft 56, to the table 1.

As this takes place, the clutch 65 locks the shaft 33 in position while the clutch 67 disengages the shaft 33 from the worm wheel 28, which causes the electric motor 24 to rotate either the shaft 33 or the shaft 69 in turn.

The amount of rotation of the table 1 about its axis as powered from the motor 24, is checked by an electroinductive transducer 99 (FIG. 8) whose stepped motor 89 operates to turn the screw 95 and, by moving the nut 94, to actuate the arm 91 which turns the stator 90 to bring it to a position of preset rotation of the table 1. As the shaft 69 and the armature 93 are rotated, data about the amount of the angle of rotation of the table 1 about its vertical axis is being fed to the machine control system, and as soon as the preset amount of the angle of rotation is reached, the braking clutch 66 will lock the shaft 69 in position and the clutch 68 will disengage the worm wheel 28 from the shaft 69.

The herein proposed table positioning device extends the technological capabilities of the machine tool and allows a large degree of automation of the machining process.

Furthermore, the herein proposed table positioning device wherein rectilinear movements of the table are substituted by circular rotary motion of the links of the mechanism, offers the following advantages:

the need for labour-consuming and expensive manufacture of straight V-ways arranged crosswise is eliminated;

radial rolling-contact bearings and thrust bearings having flat races are easy to manufacture and mount, while practically attainable accuracy of the circular ways is better than that of the straight ways;

circular feedback transducers operate in an automatic tracking mode effecting direct control over the table movements;

circular electroinductive transducers are far simpler and less expensive in manufacture and maintenance, and they are less sensitive to temperature strains than linear feedback transducers;

because of the fact that in circular positioning mechanisms, the distances between the axes of rotation are adjusted with respect to the actual geometric centres of rotation, the positioning accuracy is unaffected by the constant radial runout of the pivot pin bearings;

the circular positioning mechanisms, which constitute the mechanical part of the automated equipment, are better adapted to employment of electronic numeric control systems, and can be readily incorporated in both small- and large-size machine tools;

inertial forces produced in the course of positioning are much less than those generated in rectilinear movement mechanisms;

time-consuming location and datuming of workpieces on the machine table before they are held to it can be dispensed with;

the machine table can be positioned either to preset coordinates of individual points or along preset pathways, which enables the workpiece to be moved in the course of grinding holes having plain or profile cross sections;

it is favourable that the housings of machine tools mounting such positioning devices be made from nonalloyed cast iron.

What is claimed is:

1. A device for positioning the table of a metal-cutting machine tool in a horizontal plane along two coordinate axes, which comprises:
   a base;
   a drive mounted on said base and adapted to move said table in a horizontal plane;
   another drive mounted on said base and adapted to move said table in a horizontal plane;
   a contrivance for setting the position of said table during its movement wherein the adjacent sides of said table are in parallel alignment with the coordinate axes in a horizontal plane, said contrivance being mounted on said base and comprising:
   one disk provided with a pivot pin and kinematically associated with said one drive for moving said table in a horizontal plane, said one disk being capable of rotation about its axis;
   another disk provided with a pivot pin eccentrically arranged with respect to the pivot pin of said one disk, kinematically associated with another drive for moving said table in a horizontal plane, and disposed above said one disk, said another disk being capable of rotation about its axis and with respect to the axis of said one disk;
   a pin fixed in position on said another disk a distance from the axis thereof equal to the amount of eccentricity of the pivot pins of said disks, said pin being movably associated with said table;
   a driving element associated with said base;
   a driven element associated with said table and movably associated with said driving element, the gearing ratio between these elements being equal to 1;
   one means for reading the length of movement of said table in a horizontal plane along one of its coordinate axes, mounted on the pivot pin of said one disk;
   another means for reading the length of movement of said table in a horizontal plane along another of its coordinate axes, mounted on said pin.

2. A device as claimed in claim 1 wherein each of said drives for moving the table in a horizontal plane comprises individually:
   an electric motor;
   a shaft of said electric motor;
   a worm gear reducer;
   an input shaft of said worm gear reducer locked-in with said shaft of said electric motor;
   an output shaft of said worm gear reducer;
   a worm wheel mounted on said output shaft of said reducer;
   a worm meshing with said worm wheel;
   one gear mounted on said output shaft of said worm gear reducer;
   another gear meshing with said one gear and locked in position on said one disk or on said another disk.

3. A device as claimed in claim 1 wherein said elements movably associated with each other and incorporated in the contrivance for setting the table position, are arranged so as to form a double four-link mechanism which comprises:
   a driving link articulately joined to said base;
   a driven link articulately joined to said table.

4. A device as claimed in claim 3 wherein said contrivance for setting the table position is provided with a drive adapted to turn the table about a vertical axis through a preset angle and to hold it therein, which comprises:

a segment articulately joined to said driving link of said double four-link mechanism;
a shaft of said segment;
an electric motor;
a shaft of said electric motor;
one electromagnetic clutch connecting said shaft of said electric motor to said shaft of said segment;
another electromagnetic clutch connecting said shaft of said segment to said base.

5. A device as claimed in claim 1 wherein said elements movably associated with each other and incorporated in said contrivance for setting the table position, are arranged so as to form a gear transmission which comprises:
a driving gear locked-in with said base;
a driven gear locked-in with said table and arranged as to be the last gear in said gear transmission, there being an even number of gears in said gear transmission.

6. A device as claimed in claim 5 wherein said contrivance for setting the table position is provided with a drive adapted to turn the table about a vertical axis through a preset angle and to hold it therein, which comprises:
an electric motor;
a shaft of said electric motor;
a worm gear reducer;
an input shaft of said worm gear reducer locked-in with said shaft of said electric motor;
an output shaft of said worm gear reducer;
a worm wheel mounted on said output shaft of said worm gear reducer;
a worm meshing with said worm wheel;
one gear mounted on said output shaft of said worm gear reducer;
another gear meshing with said one gear and locked in position on said another disk;
one braking electromagnetic clutch adapted to connect said base to said output shaft of said worm gear reducer;
another braking electromagnetic clutch adapted to connect said base to said driving gear of said gear transmission;
one engagement electromagnetic clutch adapted to connect said worm wheel of said worm gear reducer to said output shaft of said reducer;
another engagement electromagnetic clutch adapted to connect said worm wheel to said driving gear of said gear transmission.

7. A device as claimed in claim 1 wherein said elements movably associated with each other and incorporated in said contrivance for setting the table position are arranged so as to form a chain transmission which comprises;
a driving sprocket fixedly secured to said base;
a driven sprocket arranged as to be the last in said chain transmission and locked-in with said table.

8. A device as claimed in claim 7 wherein said contrivance for setting the table position is provided with a drive adapted to turn the table about a vertical axis through a preset angle and to hold it therein, which comprises:
an electric motor;
a shaft of said electric motor;
a worm gear reducer;
an input shaft of said worm gear reducer locked-in with said shaft of said electric motor;
an output shaft of said worm gear reducer;
a worm wheel mounted on said output shaft of said worm gear reducer;
a worm meshing with said worm wheel;
one gear mounted on said output shaft of said worm gear reducer;
another gear meshing with said one gear and fixedly secured to said another disk;
one braking electromagnetic clutch adapted to connect said base to said output shaft of said worm gear reducer;
another braking electromagnetic clutch adapted to connect said base to said driving sprocket of said chain transmission;
one engagement electromagnetic clutch adapted to connect said worm wheel of said worm gear reducer to said output shaft of said reducer;
another engagement electromagnetic clutch adapted to connect said worm wheel to said driving sprocket of said chain transmission.

9. A device as claimed in claim 1 wherein each of said means for reading the length of table movement comprises:
a stepped electric motor;
a shaft of said stepped electric motor;
a circular electroinductive transducer;
a pulse setter, one of said circular electroinductive transducers being comprised of:
a stator mounted on the pivot pin of said one disk and electrically associated with said pulse setter;
an arm locked-in with said stator and mounted on the pivot pin of said one disk;
an armature locked in position on said lower disk;
a ball screw drive comprising:
a nut locked in position on said arm;
a screw attached to said base and kinematically associated with said shaft of said stepped electric motor;
and another of said circular electroinductive transducers being comprised of:
a stator mounted on said pin and electrically associated with said pulse setter;
an arm locked-in with said stator and mounted on said pin;
an armature locked in position on said another disk;
a ball screw drive comprising:
a nut locked in position on said arm;
a screw attached to said table and kinematically associated with said shaft of said stepped electric motor.

* * * * *